United States Patent [19]

Inami et al.

[11] 4,240,194
[45] Dec. 23, 1980

[54] AUTOMATIC TOOLING MACHINE

[76] Inventors: Sumiaki Inami; Haruhiko Koike; Motohiko Yoshida, all of No. 1, Aza Norifune, Oaza Koguchi, Niwa-gun Aichi Prefecture, Japan

[21] Appl. No.: 20,945

[22] Filed: Mar. 15, 1979

Related U.S. Application Data

[63] Continuation-in-part of Ser. No. 940,891, Sep. 11, 1978, abandoned, which is a continuation of Ser. No. 783,459, Mar. 31, 1977, abandoned.

[30] Foreign Application Priority Data

| Apr. 9, 1976  | [JP] | Japan | 51/40799 |
| Apr. 23, 1976 | [JP] | Japan | 51/47100 |
| Apr. 26, 1976 | [JP] | Japan | 51/48140 |

[51] Int. Cl.$^3$ .......................................... B23Q 3/157
[52] U.S. Cl. .................................. 29/568; 414/277; 414/280
[58] Field of Search ................... 29/568; 414/277, 280

[56] References Cited

U.S. PATENT DOCUMENTS

| 3,052,011 | 9/1962  | Branard et al. | 29/568  |
| 3,312,370 | 4/1967  | Kolarich et al.| 414/740 |
| 3,355,797 | 12/1967 | Lohneis        | 29/568  |
| 3,355,798 | 12/1967 | Drechsler      | 29/568  |
| 3,571,912 | 3/1971  | Killma         | 29/568  |
| 3,715,040 | 2/1973  | Polus et al.   | 414/280 |
| 3,782,565 | 1/1974  | Doran et al.   | 414/277 |
| 3,987,909 | 10/1976 | Protrowski     | 29/568  |

Primary Examiner—Lawrence J. Oresky
Attorney, Agent, or Firm—Wenderoth, Lind & Ponack

[57] ABSTRACT

An automatic tooling machine includes a spindle carrier having a spindle for supporting a machining tool. The spindle carrier includes a tool drum mounting device for rotatably supporting a tool drum having plural machining tools thereon. A device is provided for transferring a selected machining tool between the tool drum supported on the tool drum mounting device and the spindle. A drum storage rack is fixedly positioned separate from the spindle carrier and extends in a longitudinal direction. The rack includes a plurality of drum support members for storing a plurality of tool drums. A carriage track is integral with the spindle carrier. A device is provided for selectively moving the spindle carrier to a position such that the carriage track is positioned adjacent and aligned with a selected of the drum support members. A carriage is provided for moving the tool drum of the selected drum support member along the carriage track between the tool drum mounting device and the selected drum support member. A servo-motor and worm gear arrangement is provided for rotating the tool drum on the tool drum mounting device.

11 Claims, 14 Drawing Figures

AUTOMATIC TOOLING MACHINE

This is a continuation-in-part of application Ser. No. 940,891, filed Sept. 11, 1978, now abandoned which is a continuation of application Ser. No. 783,459, filed Mar. 31, 1977, now abandoned.

BACKGROUND OF THE INVENTION

The present invention relates to an automatic tooling machine of the type in which a tool drum is automatically exchanged along a track between the body of the machine and a drum storage rack.

Known such automatic tooling machines have required the manual replacement of tool drums when the machine is to perform a tooling operation requiring a tool not carried by the particular tool drum already mounted in place. The tool drum is normally mounted on a rotary center shaft, and the exchange of tool drums is a difficult operation since the tool drum must be substantially moved axially thereof and then lifted, for example by means of a hoist. This inherently results in a considerable length of downtime of the overall machine, and also presents several safety hazards to the workers involved.

Furthermore, in known automatic tooling machines of this type, rotation of the tool drum is normally achieved by a hydraulic motor via a complicated reduction gearing system. This arrangement is disadvantageous due to the complicated structure involved, the large size of such structure, and the high cost thereof.

Additionally, in such known automatic tooling machines, the various tools supported by a given tool drum are not precisely equally spaced around the circumference of the tool drum. Therefore, the indexing of the tool drum between tool removal positions about the circumference thereof has in the past required a complicated and expensive special indexing or control mechanism.

SUMMARY OF THE INVENTION

With the above discussion in mind, it is a first object of the present invention to provide an improved automatic tooling machine whereby rotation of the tool drum is achieved by a direct mechanical drive directly controlled by a computerized numerically programmed control module of the automatic tooling machine itself, thereby greatly simplifying the indexing operation of the tool drum between tool positions, particularly when the tools are not equally spaced around the circumference of the tool drum.

A further object of the present invention is to provide an automatic tooling machine including a fixedly positioned drum storage rack which is maintained entirely separate from the remainder of the machine, and whereby a selected tool drum among a plurality of tool drums stored in the rack may be automatically moved to and from the drum rotating device of the machine, without the need for manual labor.

A further object of the present invention is the provision of an automatic tooling machine including structure for automatically connecting a tool drum to and disconnecting the tool drum from the tool drum rotating device, without the need for manual labor.

The above objects are achieved in accordance with the present invention by the provision of an automatic tooling machine including a spindle carrier having a spindle for supporting a machining tool, the spindle carrier including a device for rotatably supporting a tool drum having a plurality of machining tools, and a tool transfer device for transferring a given machining tool between the tool drum supported on the drum mounting device and the spindle. A drum storage rack is fixedly positioned at a location separate from the spindle carrier and extends in a longitudinal direction. The rack includes a plurality of drum support members for storing a plurality of tool drums. The spindle carrier has integral therewith a carriage track. The spindle carrier is movable in response to the computerized numerical program of the overall machine, to a position such that the carriage track is positioned adjacent to and aligned with a selected of the drum support members of the rack. The spindle carrier includes a device for moving the tool drum associated with a selected drum support member along the carriage track between the selected drum support member and the tool drum mounting device of the spindle carrier. The spindle carrier includes a device for rotating the tool drum on the tool drum mounting device.

In accordance with a further feature of the present invention each drum support member includes a pin which may be automatically moved into and out of the respective tool drum thereof to initiate support and release, respectively, of the respective tool drum. The operation of these pins may be controlled by the computerized numerical program control of the overall machine.

In accordance with a further feature of the present invention, each drum support member has a transverse cross-sectional configuration identical to that of the carriage track, so that the respective tool drum may be smoothly moved in a sliding manner between the respective drum support member and the carriage track, by means of aligned tracks or rails thereon.

In accordance with a further feature of the present invention the carriage track has thereon a detector which is operable with a corresponding detector on each of the drum support members to detect the alignment of the carriage track with a selected drum support member.

In accordance with a further feature of the present invention the carriage track includes a base track member fixed to the spindle carrier and an extension track member fixed to the spindle carrier and extending therefrom toward the drum storage rack. The extension track member and the base track member are aligned and have identical transverse cross-sectional configurations. The extension track member and the base track member have aligned side tracks for guiding therealong the tool drum, and further preferably the side tracks of the carriage track may align with similar side tracks in each of the drum support members.

The extension track member and the base track member may further have therein an aligned upper track which is adapted to align with an upper track in each of the drum support members. A carriage may be mounted for sliding movement along the upper tracks of the base track member, the extension track member and the selected drum support member. A cylinder-piston arrangement is provided for reciprocatingly moving the carriage along the upper tracks, such that the carriage is moved between the tool drum of the selected drum support member and the drum rotating device on the spindle carrier.

In accordance with a further feature of the present invention the tool drum mounting device includes a circular orbit or bearing surface within the base track member and a circular rotatable carriage rotatably mounted within the base track member and having a surface supported by and bearing against the circular orbit surface. An engagement device is mounted axially centrally of the rotatable carriage to engage a selected tool drum axially centrally thereof.

Preferably, the rotatable carriage has therein guide tracks adapted to align with the side tracks of the base track member when the rotatable carriage is rotated to a beginning transfer position. The circular orbit or bearing surface of the base track member and an adjacent portion of the circular rotatable carriage may have mutual detectors to detect when the rotatable carriage is rotated to the beginning transfer position.

The tool drum has therein an axial recess, and the engagement device includes a pneumatically operable pin which is axially movable into and out of the recess. A rod slidably extends axially through the tool drum and has a first end which is spring biased into the recess. A second end of the rod has thereon a radially extending arm. A drum cover is positioned to cover the front or tool exposed surface of the tool drum, and a positioning pin attached to the arm extends through the drum cover and into a hole in the tool drum. Movement of the pin into the recess of the tool drum moves the rod, the arm and the positioning pin axially of the tool drum, such that the positioning pin is withdrawn from the hole in the tool drum.

In accordance with a further feature of the present invention, the rotatable carriage has on the periphery thereof a worm gear. The device for rotating the tool drum includes a servo-motor mounted on the spindle carrier, a worm shaft driven by the servo-motor, and a worm carried by the worm shaft and in engagement with the worm gear. Thus, operation of the servo-motor in accordance with the computerized numerical program of the overall machine, will cause forward or reverse rotation of the servo-motor, and thereby rotation in opposite directions of the rotatable carriage and the tool drum supported thereby. Indexing of the tool drum may thereby by precisely achieved by a positive mechanical rotation without complicated indexing equipment.

BRIEF DESCRIPTION OF THE DRAWINGS

Other objects, features and advantages of the present invention will be apparent from the following detailed description, taken with the accompanying drawings, wherein.

DETAILED DESCRIPTION OF THE INVENTION

Figure 8:
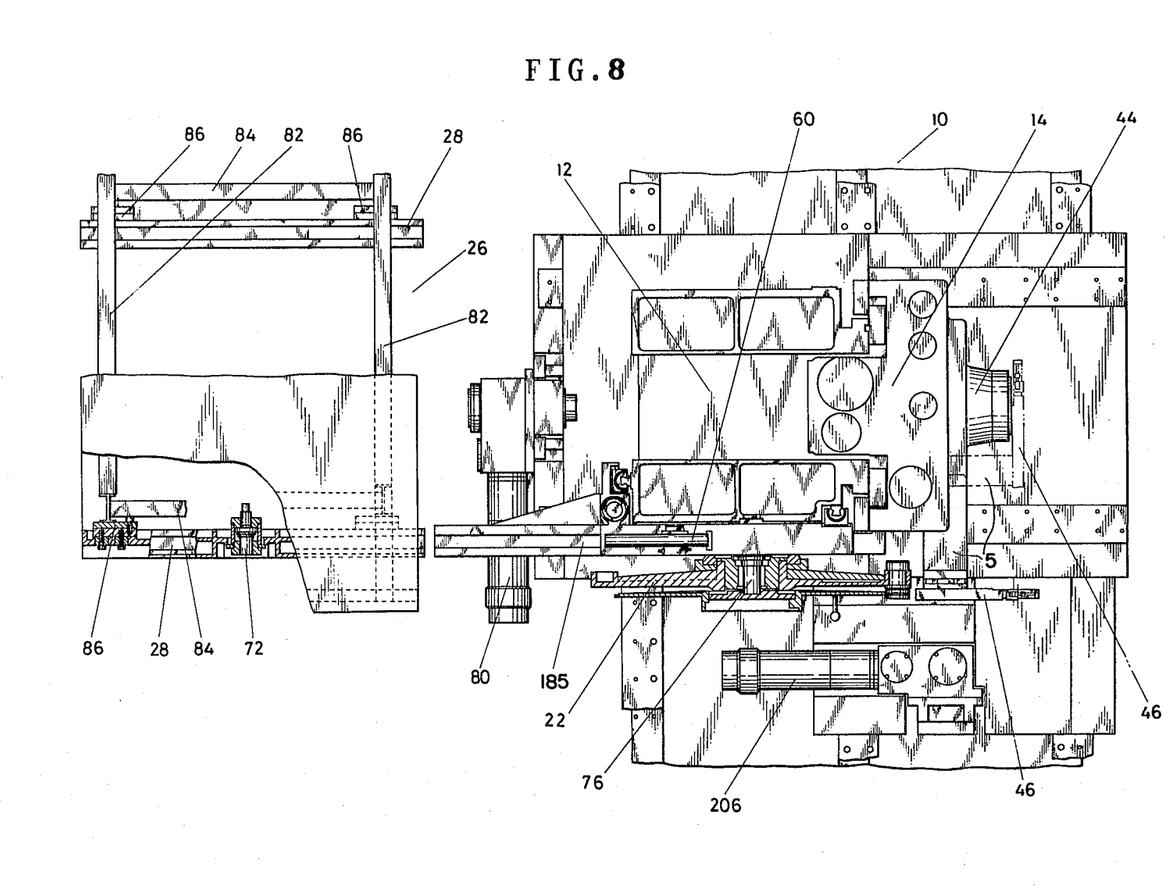
FIG. 8 is a plan view, partially in section, of the machine of FIG. 7.

As shown in the drawings, the automatic tooling machine, generally designated by the reference numeral 10, includes a base member 1 mounted for movement in a Z-axis direction along rails 2 by a Z-axis NC servo-motor 206 (FIG. 8). A column 12 is mounted for movement in a X-axis direction along rails 3 on base member 1 by means of an X-axis NC servo-motor 80 (FIG. 8). A spindle carrier 14 has thereon a tool-carrying spindle 44 and is movable vertically in a Y-axis direction along column 12 by means of a Y-axis NC servo-motor (not shown). Movement of these members in the various axis directions is controlled by a computerized numerically programmed control module 30 in a manner which is known in the art and which in and of itself does not form the present invention, to bring a tool carried by spindle 44 to a desired machining position with respect to various work products, generally designated by reference numeral 4, to be machined.

Figure 1:
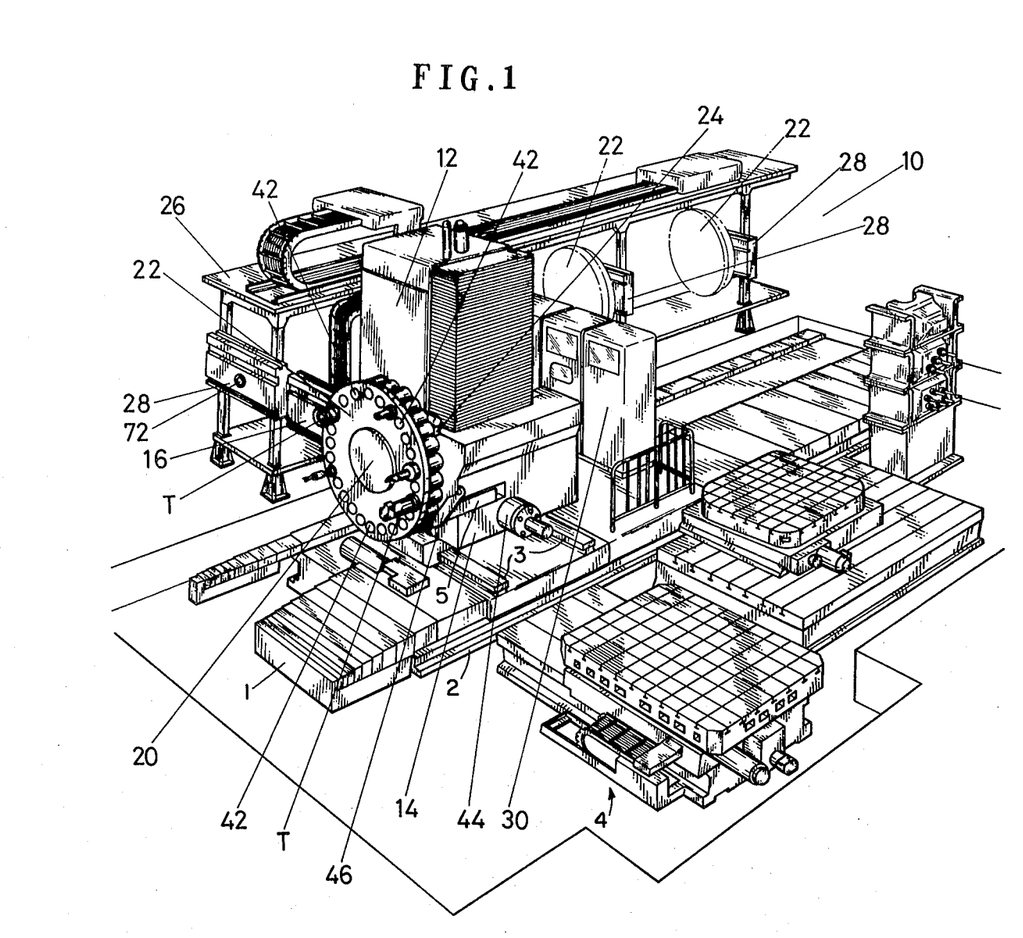
FIG. 1 is a perspective view of one embodiment of an automatic tooling machine according to the present invention.
Figure 2:
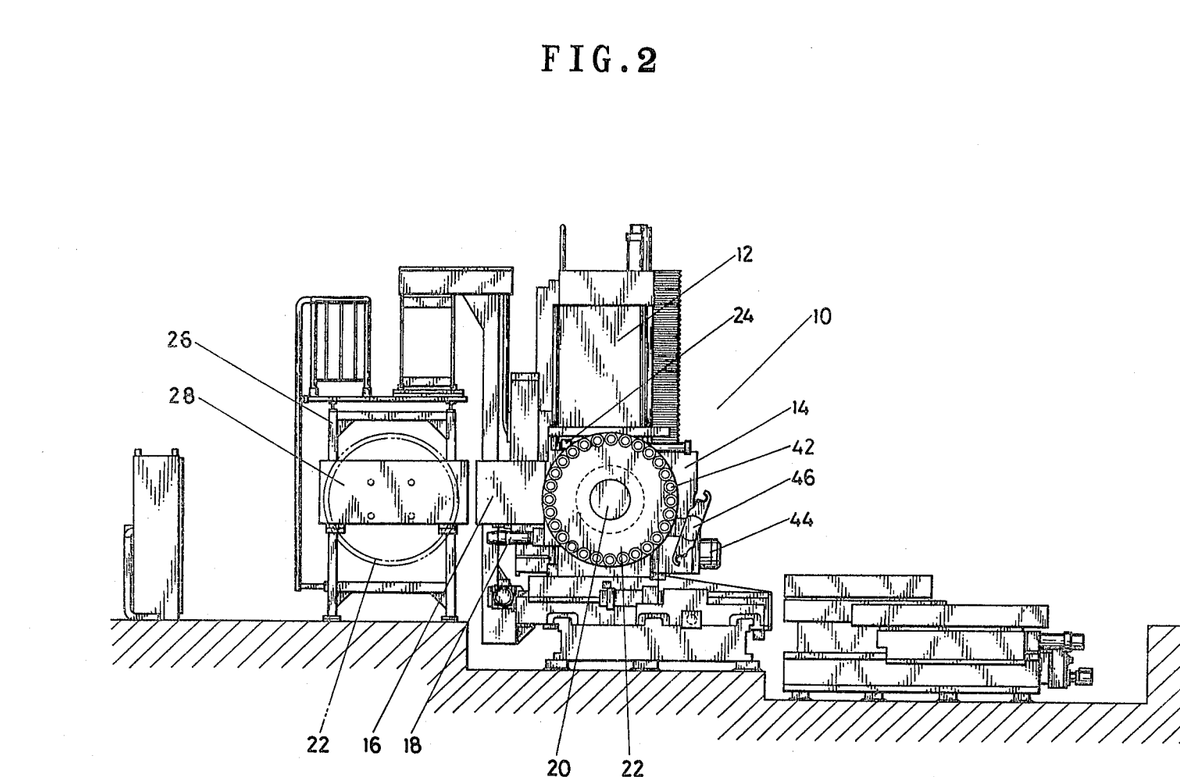
FIG. 2 is a side view of the machine of FIG. 1.
Figure 3:
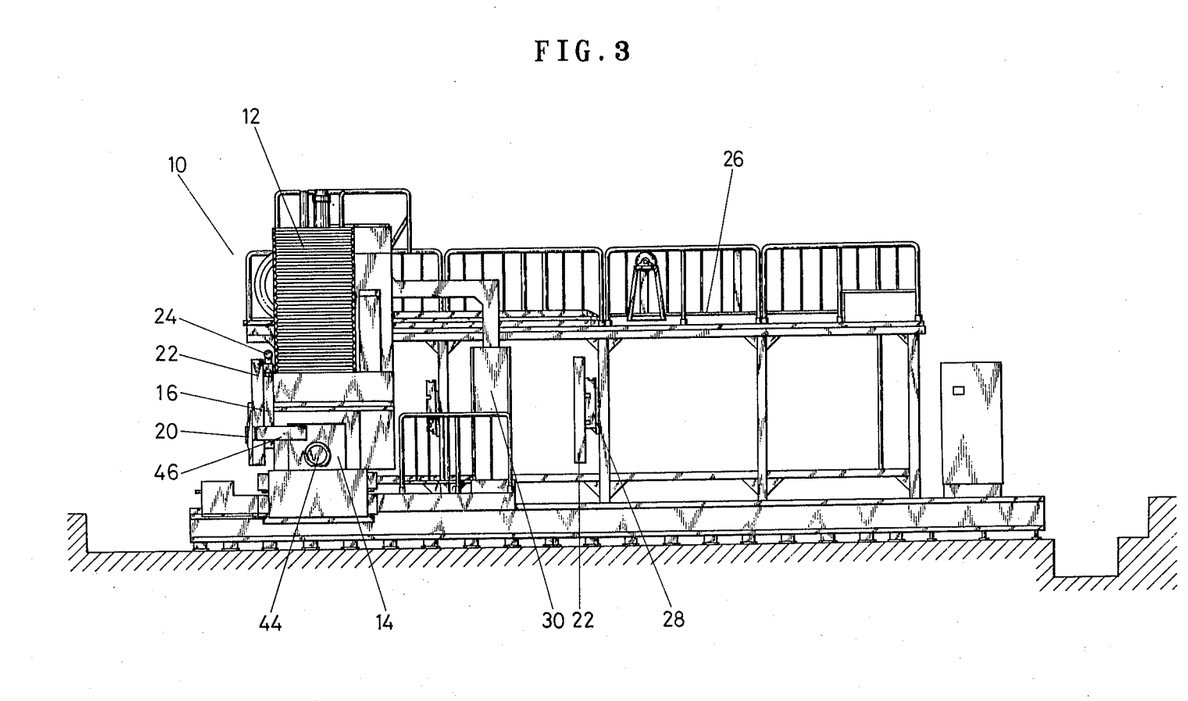
FIG. 3 is a front view of the machine of FIG. 1.

The spindle carrier 14 includes a tool drum mounting device, generally designated by reference numeral 20 in FIG. 1, for rotatably supporting a tool drum 22 having circumferentially spaced therearound a plurality of tool supporting sockets 42 which support various machining tools T.

The spindle carrier 14 has mounted thereon a conventional automatic tool changer 46. The particular construction and manner of operation of automatic tool changer 46 does not in and of itself form a portion of the present invention. However, it is intended that the present invention be operable with any known such automatic tool changer 46 which is supported by an arm 5 which is adapted to pivot with respect to spindle carrier 14 between the solid line position shown in FIG. 8 to the dashed line position shown in FIG. 8. Further, the automatic tool changer 46 is constructed, in a known manner, to pivot with respect to arm 5 to grasp or release a tool from the tool drum 22 supported at the tool drum mounting device 20 when in the solid line position of FIG. 8, and to grasp or release a tool at spindle 44 when in the dashed line position shown schematically in FIG. 8. It is again emphasized that the specific construction and manner of operation of automatic tool changer 46 does not in and of itself form the present invention, and any known such automatic tool changer device may be employed in the device of the present invention.

In accordance with the present invention there is provided a fixedly positioned drum storage rack 26 which is separate from base member 1, column 12 and spindle carrier 14. Drum storage rack 26 includes vertical beams 66, horizontal longitudinal beams 82, and horizontal cross beams 84. Drum storage rack 26 extends in a longitudinal direction parallel to one of the directions of horizontal movement of the tooling machine 10. Drum storage rack 26 includes a plurality of drum support members 28 which extend horizontally transversely of the longitudinal direction of drum storage rack 26. Each drum support member 28 has therein horizontal side tracks 68 for guiding a respective tool drum 22. Further, each drum support member 28 has therein a pin 72 which is extendable into and retractable from a recess in the respective tool drum 22 to support or release, respectively, such tool drum. Operation of pin 72 may be achieved automatically, in a manner which will be discussed in more detail below. Each drum support member 28 is supported on drum storage rack 26 by brackets 86 (see FIGS. 7 and 8).

The spindle carrier 14 has integral therewith a carriage track 16 which has a cross-sectional configuration identical with that of each of the drum support members 28. The computerized numerically programmed control module 30 is programmed such that when a selected tool T is desired for a given machining operation, then the memory of the program causes movement of the machine in the X, Y and Z directions to align the carriage track 16 with a selected drum support member 28 which carries the particular tool drum 22 containing the desired tool T.

The carriage track includes a base track member 48 fixed to spindle carrier 14 and an extension track member 52 fixed to the spindle carrier 14 and extending therefrom toward the drum storage rack 26. The extension track member 52 and the base track member 48 are aligned and have identical transverse cross-sectional configurations. Specifically, the extension track member 52 and base track member 48 have aligned side tracks 50 which are adapted to align with side tracks 68 in each of the drum support members 28.

Further, the extension track member 52 and base track member 48 have therein aligned upper tracks 185 (FIG. 8) adapted to align with upper tracks 186 (FIG. 7) in each of the drum support members 28. Thus, when the carriage track 16 is aligned with a selected drum support member 28, a carriage 60 is adapted to be moved along aligned upper tracks 185 and 186 to move a selected tool drum 22 from the respective drum support member 28 thereof to the position of the tool drum mounting device 20, or alternatively to return a tool drum 22 from the tool drum mounting device 20 back to its respective drum support member 28.

Figure 12:
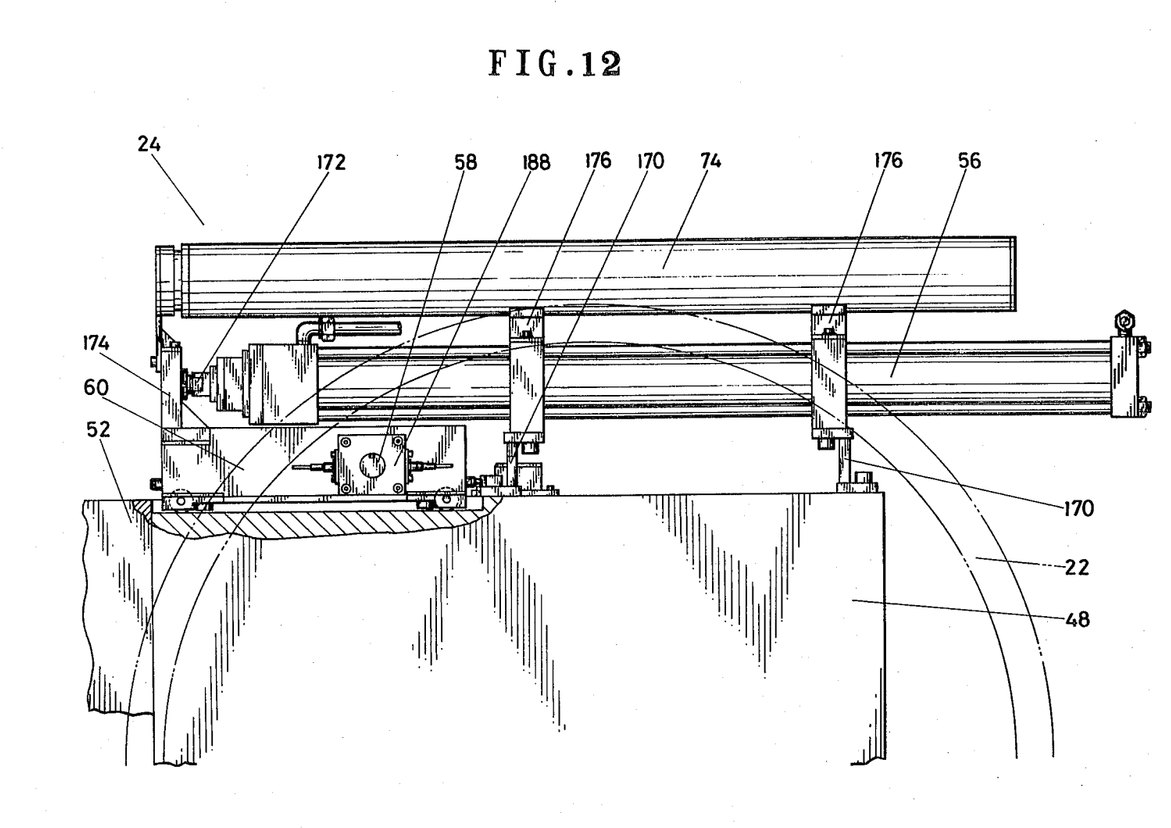
FIG. 12 is an enlarged view, partially in section, of the carriage for moving a selected tool drum.
Figure 13:
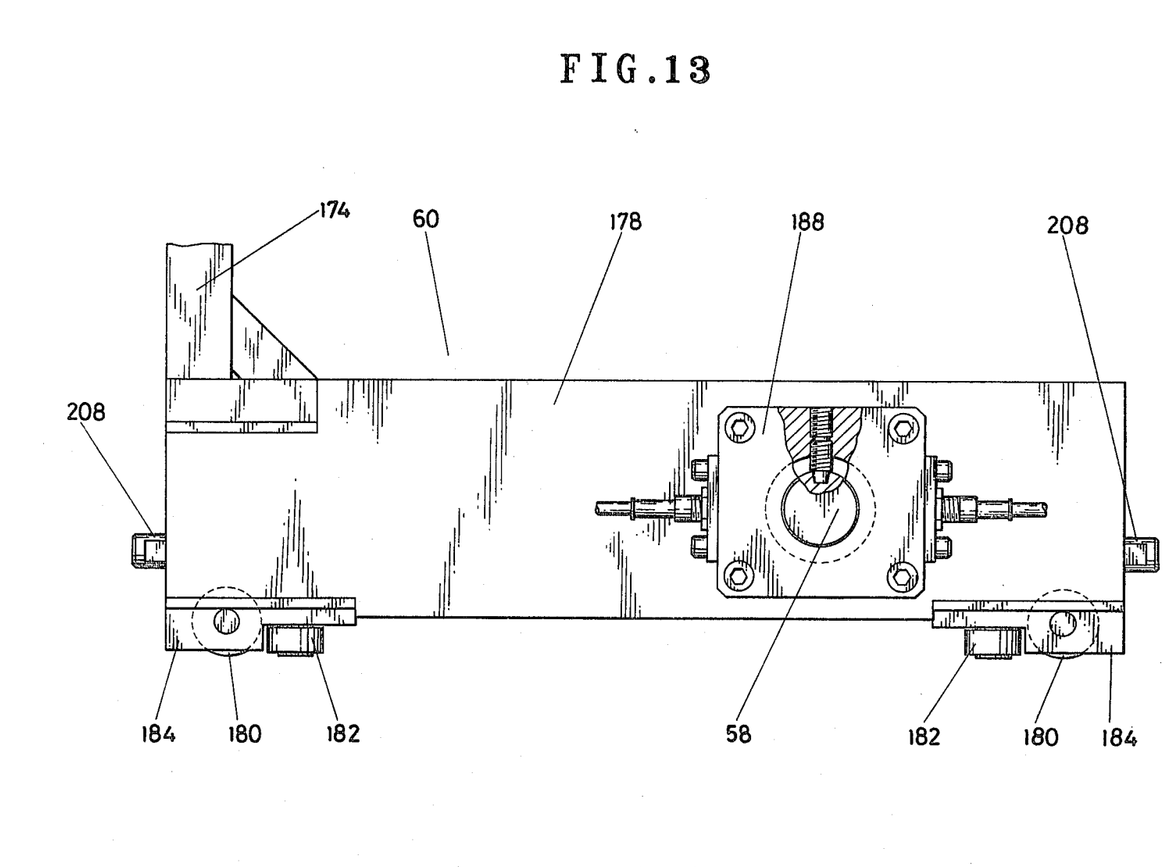
FIG. 13 is an enlarged view of a portion of the device of FIG. 12.
Figure 14:
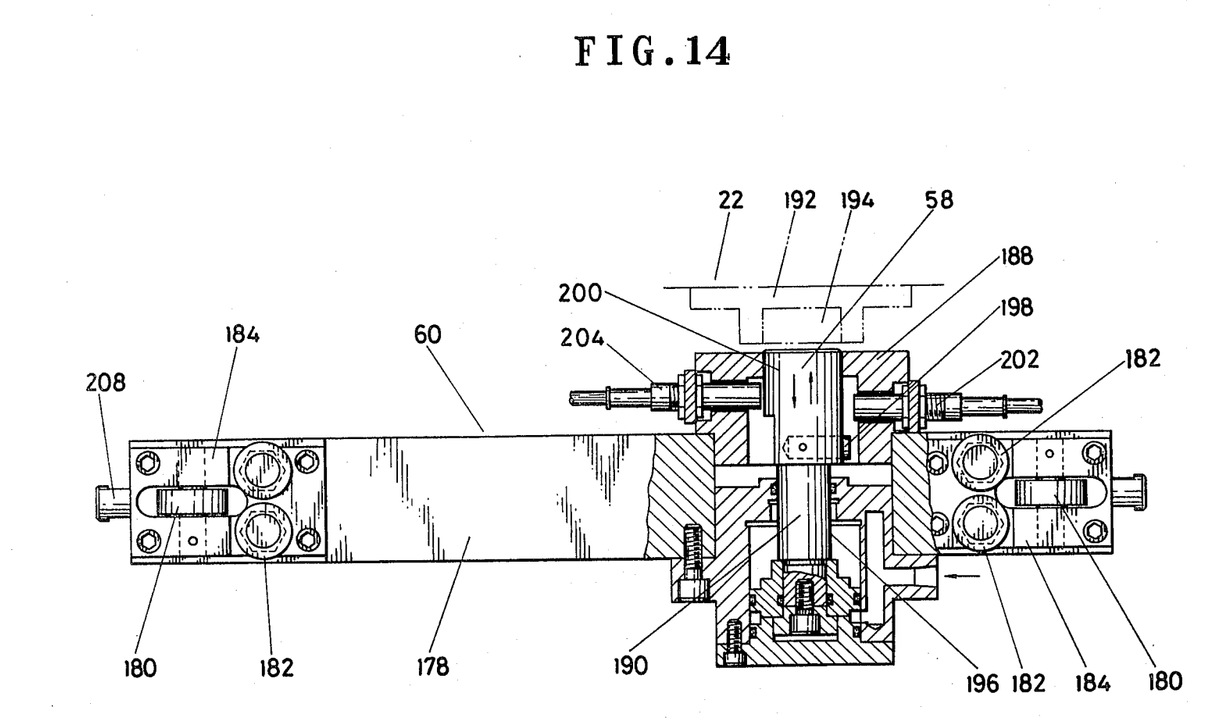
FIG. 14 is a view from the bottom, and partially in section, of the device of FIG. 13.

More particularly, and with reference to FIGS. 12, 13 and 14, the carriage 60 has on the bottom thereof trucks 184 which support vertical rollers 180 and horizontal rollers 182 which guide the carriage 60 within upper tracks 185 and 186.

The carriage 60 is moved along the upper tracks by a drum shifter device 24 which includes a drum shifting cylinder 56 mounted on the upper part of base track member 48 by means of brackets 170. A piston rod of the drum shifting cylinder 56 is attached as at 172 to a bracket 174 which is attached to carriage 60. Thus, it will be apparent that operation of cylinder 56 to extend or retract the piston rod thereof will cause carriage 60 to move toward or away from, respectively, drum storage rack 26. the carriage 60 includes a pin 58 for selectively grasping or releasing a tool drum 22. Specifically, each tool drum 22 has thereon a boss 192 having therein a hole 194 into which pin 58 is adapted to extend. A connecting pin drive 188 is mounted within the body 178 of carriage 60. A piston 190 is connected to pin 58 and is moved in the direction of the arrows of FIG. 14 by a cylinder 196, for example an air cylinder. Thereby, the pin 58 may be moved outwardly into a recess 194 or withdrawn therefrom. Sensors 202 and 204 extend through element 188 and respectively operate to detect tip 198 and tip 200 of the pin 58 upon outward and inward movement thereof. A cylinder 74, for example for housing cables or pipes, may be supported by brackets 176.

Figure 4:
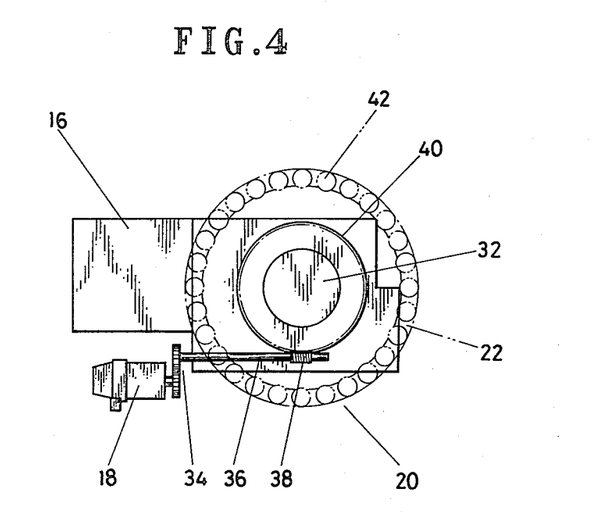
FIG. 4 is a schematic view of the tool drum indexing drive system according to the present invention.
Figure 5:
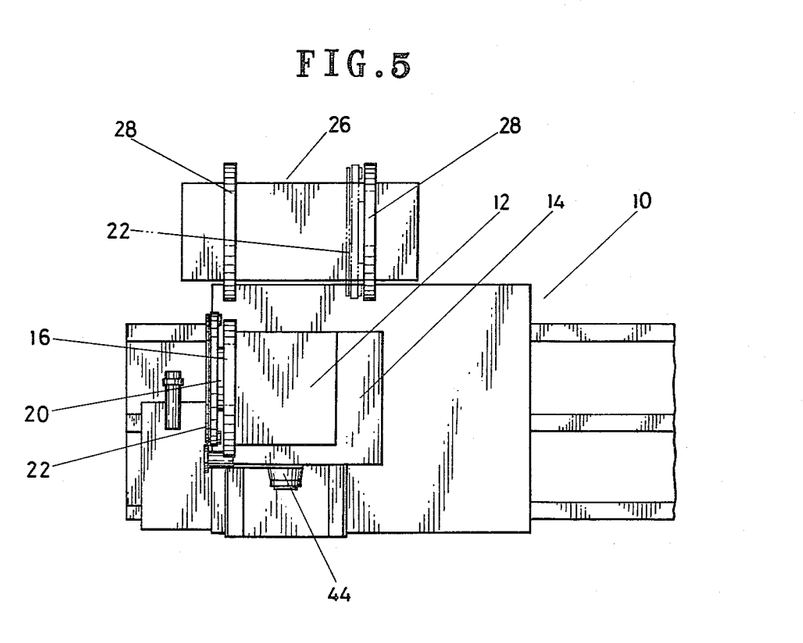
FIG. 5 is a plan view of the machine of FIG. 1.

When a selected tool drum 22 is mounted on tool drum mounting device 20, the tool drum 22 may be rotated around an index (generally indicated as 32 in FIG. 4) by means of a mechanical drive in accordance with the memory of the program in the computerized numerically programmed control module 30.

Figure 9:
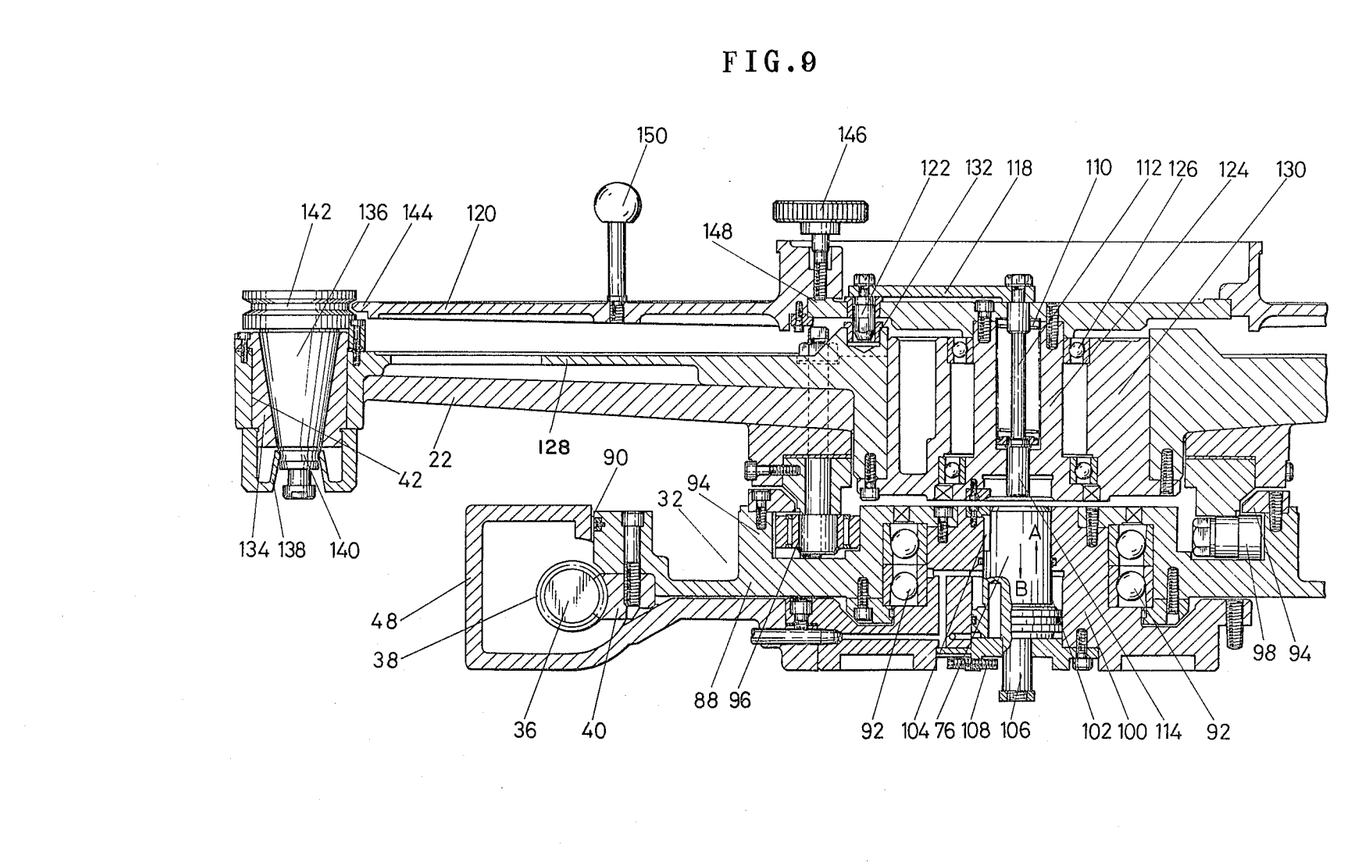
FIG. 9 is an enlarged cross-sectional view of the devices for supporting and rotating a selected tool drum.
Figure 10:
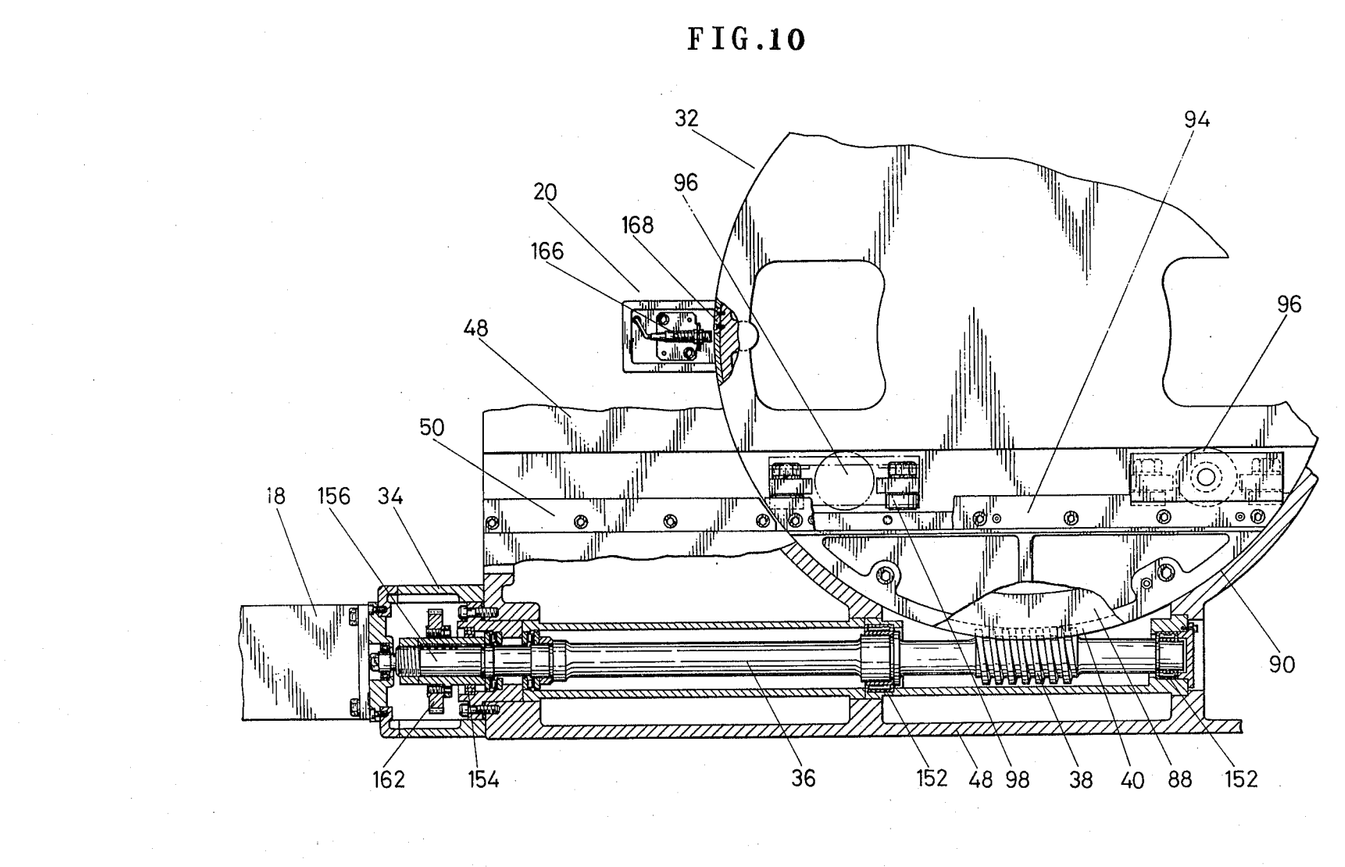
FIG. 10 is a further view, in partial section, of the drive device.
Figure 11:
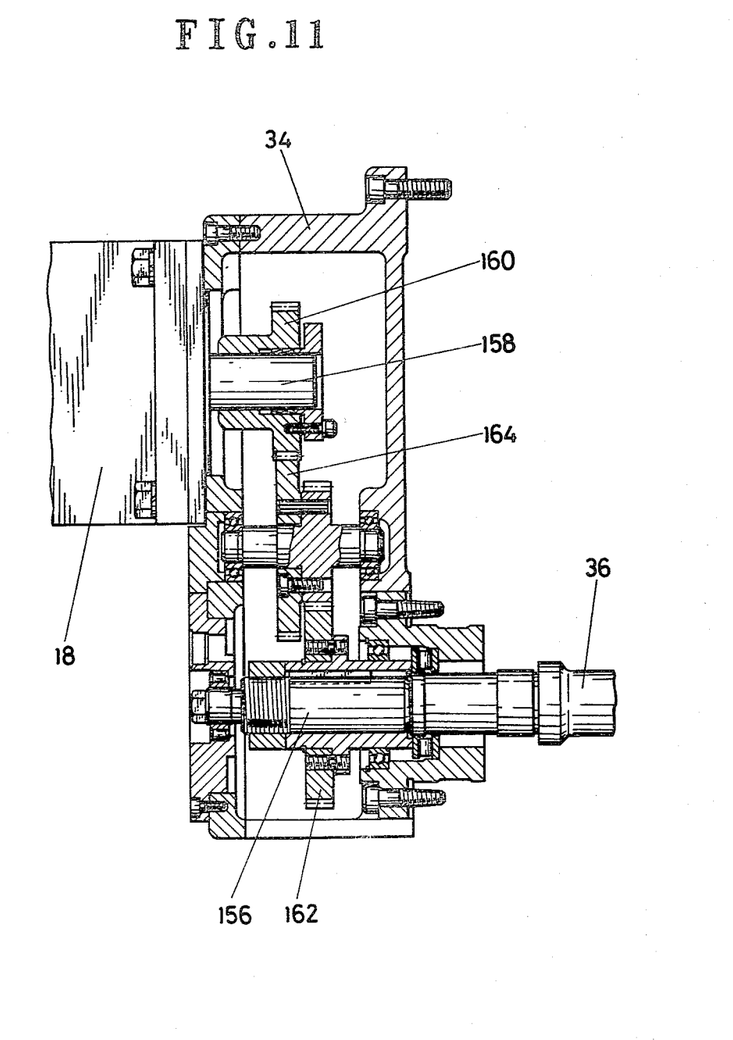
FIG. 11 is a further cross-sectional view of the drive device.

More particularly, and with reference to FIGS. 9, 10 and 11, the base track member 48 has therein a circular opening or orbit surface 90. A circular rotatable carrier 88 is rotatable within orbit 90 around a hub of the base track member 48 by means of bearings 92. Rotatable carriage 88 has therein guide tracks 94 adapted to align with the side tracks 50 of base track member 48 when the rotatable carriage 88 is rotated to a beginning or start position at which transfer of the particular tool drum 22 may occur. Specifically, guide rollers 96 and 98 attached to tool drum 22 will roll in the guide rails 94.

Around the periphery of rotatable carriage 88 is a worm gear 40. An NC servo-motor 18 is mounted on the spindle carrier 14 and has a driven shaft 158. A worm shaft 36 has thereon a worm 38 which is in meshing engagement with worm gear 40. Rotation of shaft 158 is transferred to worm shaft 36 by means of a gear box 34 including a gear 160 attached to shaft 158, a gear 162 attached to an end 156 of worm shaft 36, and intermediate gear 164. Rotation of motor 18 will be controlled in accordance with the memory of the program of computerized numerically program control module 30 to thereby rotate rotatable carriage 88 in a desired direction and for a desired circumferential distance.

The rotation of rotatable carriage 88 is transferred to the tool drum 22 mounted thereon. More particularly, a center pin 76 is a portion of a pneumatically actuated piston cylinder arrangement, with pin 76 being pneumatically actuatable to be moved outwardly from or withdrawn into the hub 100. A notch 104 is provided for limiting the outward movement of pin 76. Pin 76, when moved outwardly of the hub 100, is adapted to be engaged within a recess, for example the same recess into which extends the pin 72 of the drum supporting member 28, of the tool drum 22. A sensor 108 detects the relative position of an end 106 of the pin 76.

Rotation of rotatable carriage 88 causes rotation of tool drum 22, via the positioning of rollers 96 and 98 within guide tracks 94. This similarly causes rotation of a disc 128 which has a hub 130 which rotates about a cylinder 124 via bearings 126.

Spaced circumferentially around the periphery of tool drum 22 are a plurality of tool holding pockets 42, each including a socket 134 into which is inserted a tool holder 136. A resilient stopper 138 is designed to resiliently snap into a rear groove 140 of each tool holder 136. In the front portion of each tool holder 136 is provided a front groove 142. Removal of tool holders 136 during transfer of the tool drum 22 is prevented by a drum cover 120 which has a peripheral edge 144 adapted to be fitted within front grooves 142 of the tool holders 136. Drum cover 120 has thereon a handle 150 to facilitate attaching and detaching of the drum cover. A positioning screw 146 extends through the drum cover 120 and is adapted to be engaged in or disengaged from a positioning hole 148. A rod 112 extends through cylinder 124 and has a first end 114 which is biased into the recess of the tool drum 22 by means of a spring 110. A second or outer end of rod 112 is connected to a radially inner end of an arm 118, the radially outer end of which has therein a positioning pin 122 which extends through cover 120 and which is freely engageable into and disengageable from a positioning hole 132 provided on the outer surface of hub 130 of disc 128.

It is believed that the operation of the present invention will be apparent from the above description. However, the operation of the present invention will now be described in brief.

Figure 6:
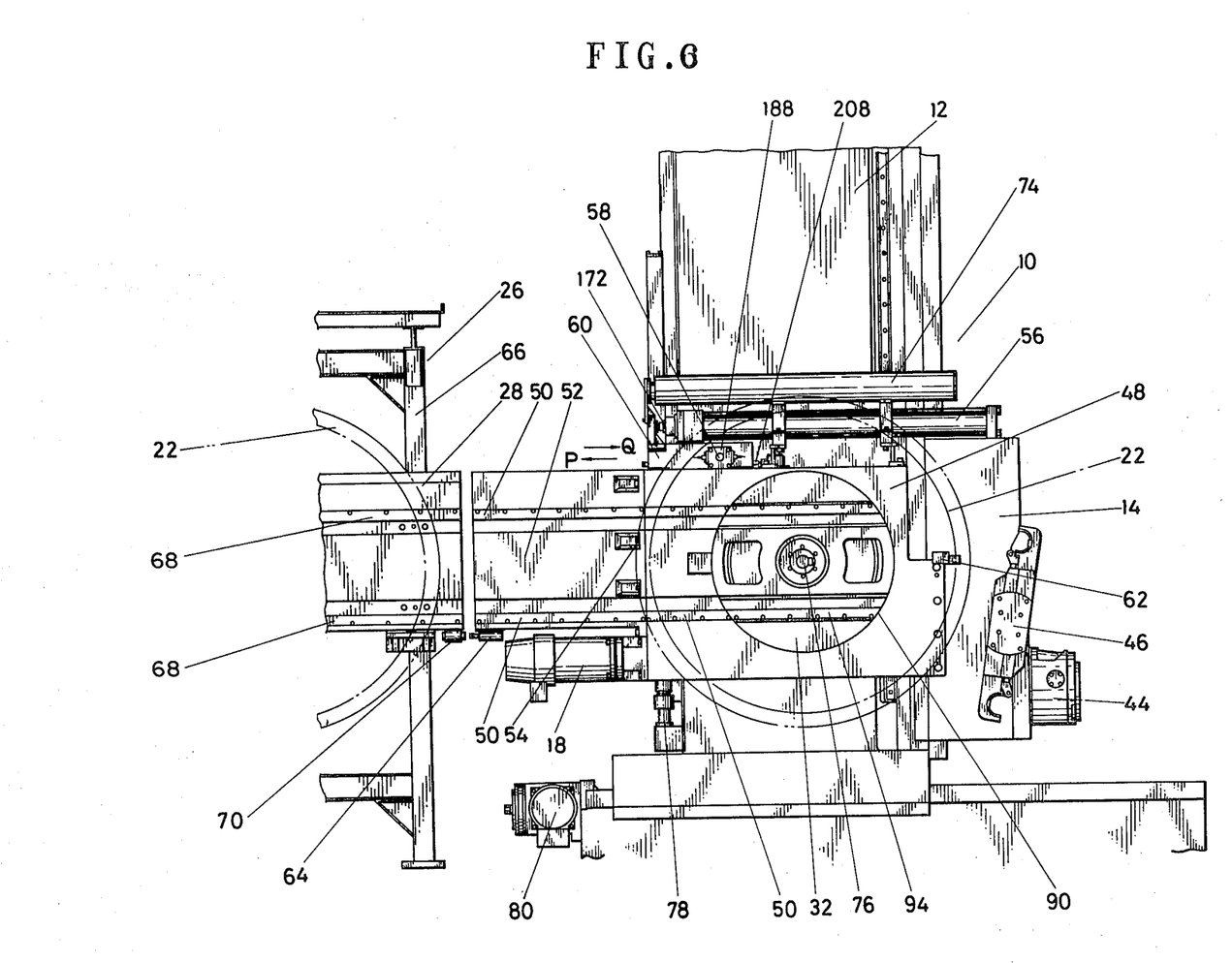
FIG. 6 is an enlarged partial side view of the machine of FIG. 1.
Figure 7:
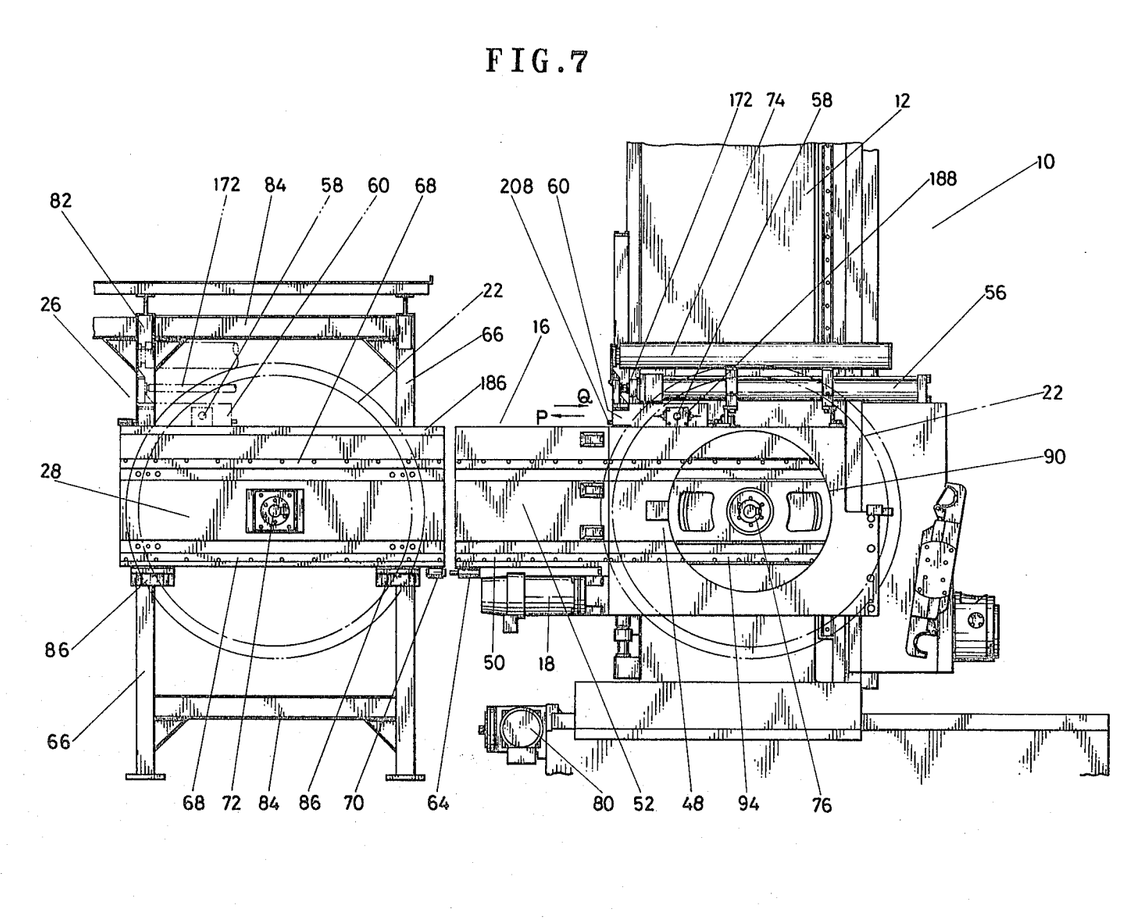
FIG. 7 is a view similar to FIG. 6, but showing in more detail various features thereof.

Upon initiation of operation of the automatic tooling machine, the memory of the program of computerized numerically programmed control module 30 will cause movement of the machine in the X, Y and Z axis directions to position the carriage track 16 adjacent to and aligned with a selected drum support member 28 which supports a selected tool drum 22 containing a particular tool T to be employed in the first desired machining operation. A sensor 70 on the selected drum support member 28 will detect the presence of an associated sensor 64 on the carriage track 16 to detect the arrival of the carriage track 16 at the correct position. This detection will be transmitted to the computerized numerically programmed control module 30, and this will initiate operation of cylinder 56 to cause movement of carriage 60 in the direction P of FIGS. 6 and 7. The carriage 60 is moved to the dashed line position shown in FIG. 7, and when pin 58 of carriage 60 is aligned with recess 194 in the tool drum 22, such position will be detected by sensor 208 (shown on the left side of carriage 60 in FIG. 7), for example by proximity or contact with a related detector on drum storage rack 26 or drum support member 28. This will cause the memory of the program of computerized numerically programmed control module 30 to cease movement of the piston rod of cylinder 56, to initiate movement of pin 58 into recess 194 (FIG. 14) and to withdraw pin 72 from the tool drum (FIG. 8). Thereafter, the control module 30 will cause cylinder 56 to retract carriage 60 in the direction Q (FIGS. 6 and 7). This will cause carriage 60 to move tool drum 22 in the direction of arrow Q, and when the tool drum 22 is moved to a position such that it axially aligns with pin 76, such position will be detected by the right-hand detector 208 (FIGS. 6 and 7). This detection will terminate operation of cylinder 56 and will initiate movement of pin 76 in the direction of arrow A (FIG. 9). During movement of the tool drum 22 from the drum support member 28, rollers 96 and 98 of tool drum 22 will roll along side tracks 68 of drum support member 28, side tracks 50 of carriage track 16, and then into guide tracks 94 of rotatable carriage 88. Device 146 of the drum cover 120 may be released from positioning hole 148, and then the handle 150 may be employed to slightly rotate drum cover 120 to a position whereat the outer circumferential edge 144 of the drum cover 120 is released from the grooves 142 of the tool holders 136, at which point the screw 146 may be again tightened.

Movement of pin 76 in the direction of arrow A will cause pin 76 to move into the recess of cylinder 124 of tool drum 22, thereby pushing against end 114 and moving rod 112 against the biasing force of spring 110. This will move arm 118 and positioning pin 122 outwardly of tool drum 22 and release pin 122 from hole 132, so that the tool drum 22 is then rotatable about cylinder 124.

The movement of pin 76 in the direction of arrow A will be detected by sensor 108, and this detection will be used by the memory of the program of computerized numerically programmed control module 30 to initiate operation of servo-motor 18 in a desired direction at a speed to achieve a desired circumferential rotation of rotatable carriage 88 and tool drum 22. Specifically, rotation of output shaft 158 will cause rotation of gear 160, gear 164, and gear 162. This will cause rotation of worm shaft 36, supported by bearings 152 and 154 (FIG. 10). This will cause rotation of worm 38 and thereby rotation of rotatable carriage 88 and tool drum 22. The extent of this rotation will be determined by the memory of the control module 30 to position a predetermined tool T at a position to be grasped by automatic tool changer 46 and to be inserted into spindle 44 for achieving a desired machining operation on work 4. This part of the operation, as well as the carrying out of the particular machining work, is well known and therefore will not be described in more detail herein.

At the completion of the given machining operation, the tool T will again be transferred by automatic tool changer 46 from spindle 44 back to the particular pocket 42 on drum 22. If the next machining operation requires another tool which is stored on the same tool drum 22, then the program of control module 30 will initiate further operation of servo-motor 18 to bring that further tool to the position of automatic tool changer 46. On the other hand, if the next tool required is in a different tool drum, then the memory of the program of computerized numerically programmed control module 30 will initiate operation of servo-motor 18 to return tool drum 22 and rotatable carriage 88 to the beginning transfer position shown in FIG. 10. Specifically, a sensor 166 on the base track member 48 is positioned to detect the presence of an associated sensor 168 on rotatable carriage 88 when the carriage 88 is rotated to the beginning position shown in FIG. 10, i.e. wherein guide tracks 94 align with side tracks 50. This detection will cause the memory of control module 30 to terminate operation of servo-motor 18 and to then initiate a return of the tool drum 22 to its respective drum support member 28. This sequence of operations will be reverse to that described above. At that time, the memory of control module 30 will initiate a new sequence of retrieving the next desired tool T, in the same manner as described above.

It is to be understood that the particular circuitry of the control module 30 is not illustrated or described herein in detail. It is believed that the circuitry necessary to provide a given program for control module 30 would be understood by one of ordinary skill in the art, upon reviewing the present discussion. It is specifically intended that any such circuitry which would be apparent to one of ordinary skill in the art be employed with the above described features of the present invention.

Although specific features of the present invention have been described and illustrated herein, it is to be understood that various modifications may be made thereto without departing from the scope of the present invention.

What we claim is:

1. In an automatic tooling machine of the type including a spindle carrier having a spindle for supporting a machining tool, said spindle carrier including tool drum mounting means for rotatably supporting a tool drum with plural machining tools thereon, means for transferring a selected machining tool between said tool drum supported on said tool drum mounting means and said spindle, and means for selectively moving said spindle in X, Y and Z directions to position said selected machining tool in a desired operating position, the improvement comprising:
- a fixedly positioned drum storage rack separate from said spindle carrier and extending in a longitudinal direction, said track including a plurality of drum support members for storing a plurality of said tool drums;
- said spindle carrier having integral therewith a carriage track;
- means for selectively moving said spindle carrier to a position such that said carriage track is positioned adjacent and aligned with a selected said drum support member;
- means, mounted on said spindle carrier, for moving the said tool drum associated with said selected drum support member along said carriage track in a selected direction between said selected drum support member and said tool drum mounting means; and
- means, mounted on said spindle carrier, for rotating said tool drum on said tool drum mounting means and for thereby selectively rotatively aligning said tool drum with respect to said tool drum mounting means.

2. The improvement claimed in claim 1, wherein each said drum support member includes pin means for selective engagement with the respective said tool drum for securing said tool drum to said drum support member.

3. The improvement claimed in claim 1, wherein each said drum support member has a transverse cross-sectional configuration identical to that of said carriage track.

4. The improvement claimed in claim 1, further comprising means, positioned on each said drum support member and on said carriage track, to detect the alignment of said carriage track with said selected drum support member.

5. The improvement claimed in claim 1, wherein said carriage track comprises a base track member fixed to said spindle carrier, and an extension track member fixed to said spindle carrier and extending therefrom toward said drum storage rack, said extension track member and said base track member being aligned and having identical transverse cross-sectional configurations, and said extension track member and said base track member have aligned side tracks for guiding therealong said tool drum.

6. The improvement claimed in claim 5, wherein said extension track member and said base track member have an aligned upper track, each said drum support member has side tracks adapted to be aligned with said side tracks of said extension track member and an upper track adapted to be aligned with said upper track of said extension track member, and wherein said tool drum moving means comprises a carriage mounted for sliding movement along said upper tracks of said base track member, extension track member and drum support member, means for reciprocatingly moving said carriage along said upper tracks, and means on said carriage for selectively grasping said tool drum and for thereby moving said tool drum along said side tracks during movement of said carriage along said upper tracks.

7. The improvement claimed in claim 5, wherein said tool drum mounting means comprises a circular orbit surface within said base track member, a circular rotatable carriage rotatably mounted in said circular orbit surface, and engagement means mounted axially centrally of said rotatable carriage for engaging said tool drum axially centrally thereof.

8. The improvement claimed in claim 7, wherein said rotatable carriage has therein guide tracks adapted to align with said side tracks of said base track member when said rotatable carriage is rotated to a beginning transfer position.

9. The improvement claimed in claim 7, wherein said tool drum has therein an axial recess, and said engagement means comprises a pneumatically operable pin axially movable into and out of said recess.

10. The improvement claimed in claim 9, further comprising a rod extending axially through said tool drum and having a first end spring biased into said recess, a second end of said rod having thereon a radially extending arm, a drum cover positioned over said tool drum, a positioning pin attached to said arm and extending through said drum cover and into a hole in said tool drum, and movement of said pin into said recess moving said rod, said arm and said positioning pin axially of said tool drum such that said positioning pin is withdrawn from said hole.

11. The improvement claimed in claim 7, wherein said rotatable carriage has on the periphery thereof a worm gear, and said rotating means comprises a servo-motor, a worm shaft driven by said servo-motor, and a worm on said worm shaft and in engagement with said worm gear.

* * * * *